United States Patent
Wang

(10) Patent No.: US 10,459,536 B2
(45) Date of Patent: Oct. 29, 2019

(54) PORTABLE CARRIER WITH MOUSE SETTING DATA AND MOUSE DEVICE

(71) Applicants: DEXIN ELECTRONIC LTD., Donggaun Guangdong (CN); DEXIN CORPORATION, New Taipei (TW)

(72) Inventor: Ting-Sheng Wang, New Taipei (TW)

(73) Assignees: DEXIN ELECTRONIC LTD., Dongguan, Guangdong (CN); DEXIN CORPORATION, New Taipei (TW)

(*) Notice: Subject to any disclaimer, the term of this patent is extended or adjusted under 35 U.S.C. 154(b) by 50 days.

(21) Appl. No.: 15/608,253

(22) Filed: May 30, 2017

(65) Prior Publication Data
US 2018/0348895 A1   Dec. 6, 2018

(51) Int. Cl.
*G06F 3/038* (2013.01)
*G06F 3/0354* (2013.01)
*G06F 17/30* (2006.01)
*G06F 21/34* (2013.01)
*G06F 16/00* (2019.01)

(52) U.S. Cl.
CPC .......... *G06F 3/03543* (2013.01); *G06F 3/038* (2013.01); *G06F 3/0383* (2013.01); *G06F 16/00* (2019.01); *G06F 21/34* (2013.01)

(58) Field of Classification Search
CPC ...... G06F 3/03543; G06F 3/038; G06F 17/30; G06F 21/34
See application file for complete search history.

(56) References Cited

U.S. PATENT DOCUMENTS

| 7,177,915 B2 * | 2/2007 | Kopchik | G06F 21/34 709/217 |
| 2005/0160223 A1 * | 7/2005 | Chen | G06F 3/08 711/115 |

FOREIGN PATENT DOCUMENTS

| CN | 102375570 A | 3/2012 |
| TW | 200947276 A1 | 11/2009 |
| TW | 201508558 A | 3/2015 |

OTHER PUBLICATIONS

"TW 200947276 ENG.pdf", Inventor: Tseng; Chi-Ze, Espacenet machine English translation of patent publication TW 200947276, published Nov. 16, 2009, made of record in the IDS submitted by Applicant on Dec. 4, 2017.*

* cited by examiner

*Primary Examiner* — Wing H Chow
(74) *Attorney, Agent, or Firm* — Li & Cai Intellectual Property (USA) Office

(57) ABSTRACT

Disclosed are a portable carrier stores a mouse setting data and a mouse device. The mouse device includes a data receiver, a data receiver, an operation interface and a processor. The data receiver receives a mouse setting data. The operation interface includes a plurality of user-operated units. The processor is connected to the data receiver, the memory unit and the operation interface. The processor sets the functions of the mouse device according to the mouse setting data, and stores the mouse setting data in the memory unit. Each of the functions of the mouse device corresponds to each of the user-operated units of the operation interface.

3 Claims, 4 Drawing Sheets

PORTABLE CARRIER WITH MOUSE SETTING DATA AND MOUSE DEVICE

BACKGROUND OF THE INVENTION

1. Field of the Invention

The present disclosure relates to a portable carrier and a mouse device; in particular, to a portable carrier storing a mouse setting data and to a mouse device that can receive its mouse setting data from the portable carrier.

2. Description of Related Art

When operating a computer, a user needs an input device to send an instruction to the computer. The mouse device is one of the input devices that people commonly use, because it is simple and convenient. In addition to some general user-operated units (such as a left button, a right button and a mouse wheel button), there may be other hot keys corresponding to specific functions configured on the mouse device. Thus, when the user presses a hot key, an instruction may be correspondingly generated and transmitted to the computer, and the computer executes the received instruction. For example, when the user is playing a strategy game, he can use the hot keys to make the computer execute attacking commands or defense commands.

However, there are many hot keys that may correspond to different functions, such that a set-up interface of the mouse device becomes complex. Every time the user uses another computer at other place, he may need to spend lots of time and effort setting functions of the hot keys on a mouse device. If the user could easily obtain a customized mouse setting data anytime and anywhere, the hotkey functions of his mouse could be set in a matter of seconds upon accessing a new computer.

SUMMARY OF THE INVENTION

The present disclosure provides a portable carrier. The portable carrier stores a mouse setting data, and includes a chip container and a chip. The chip is configured in the chip container. The mouse setting data is stored in the chip, and the mouse setting data is for setting a plurality of functions of the mouse device.

The present disclosure further provides a mouse device. This mouse device includes a data receiver, a data receiver, an operation interface and a processor. The data receiver is configured to receive a mouse setting data. The operation interface includes a plurality of user-operated units. The processor is connected to the data receiver, the memory unit and the operation interface. The processor sets the functions of the mouse device according to the mouse setting data and also stores the mouse setting data in the memory unit. Each of the functions of the mouse device corresponds to each of the user-operated units of the operation interface.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

The mouse device provided by the present disclosure can receive a mouse setting data from a portable carrier wirelessly, from a cloud server through wireless network, or wiredly from an electronic device, to quickly set functions of the mouse device. In the following description, the portable carrier storing a mouse setting data for a mouse device and the mouse device provided by the present disclosure are further illustrated.

Figure 1:
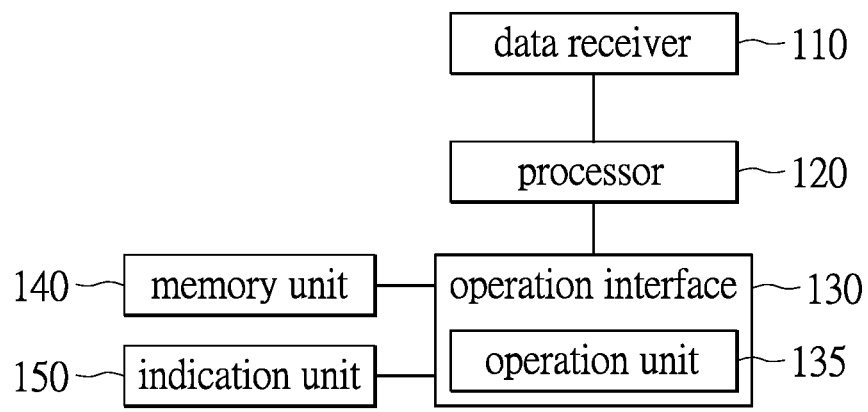
FIG. 1 shows a schematic diagram of a mouse device of one embodiment of the present disclosure.

Referring to FIG. 1, a schematic diagram of a mouse device of one embodiment of the present disclosure is shown. The mouse device 100 receives a mouse setting data from an external device, and sets the functions of its user-operated units according to the mouse setting data. As shown in FIG. 1, the mouse device 100 includes a data receiver 110, a memory unit 140, an operation interface 130 and a processor 150. The data receiver 110 receives a mouse setting data, and transmits the mouse setting data to the processor 120. The operation interface 130 has a plurality of user-operated units 135. In this embodiment, the user-operated units 135 are a left button, a right button, a mouse wheel button or other buttons corresponding to specific functions. The user-operated units 135 are configured on the housing of the mouse device 100.

The processor 120 is connected to the data receiver 110, the memory unit 140 and the operation interface 130. The processor 120 sets the functions of the user-operated units 135 according to the mouse setting data received by the data receiver 110. Also, the processor 120 stores the mouse setting data in the memory unit 140. Each function corresponds to each of the user-operated units 135 of the operation interface 130. In other words, when a user presses one user-operated unit 135, the processor 120 obtains the mouse setting data related to the pressed user-operated unit 135 from the memory unit 140, and then executes the function corresponding to the pressed user-operated unit 135. The skilled in the art should be familiar with details related to how the processor 120 sets the functions of the user-operated units 135 according to the mouse setting data, and thus further description thereon is omitted.

The mouse device 100 further includes an indication unit 150 to inform a user that the functions of the user-operated units 135 have been set by the processor 120. Specifically speaking, after the processor 120 has set the functions of the user-operated units 135 according to the mouse setting data, the indication unit 150 generates an indication signal. For example, the indication signal can be a sound and/or a flickering light, and it is not limited thereto.

In addition, the data receiver 110 can simultaneously receive the mouse setting data and an identification data. The identification data is provided for the data receiver 110 to determine whether the mouse setting data corresponds to one specific user. The functions of the user-operated units 135 are set by the processor 120 according to the mouse setting data when the data receiver 110 determines that the mouse setting data corresponds to the specific user. After that, when a user presses one of the user-operated units 135, the mouse device 100 executes the function corresponding to the pressed user-operated unit 135. On the other hand, the processor 120 does not set the functions of the user-operated units 135 when the data receiver 110 determines that the mouse setting data does not correspond to the specific user. In this case, the mouse device 100 only has the general functions of a left button, a right button and a mouse wheel button.

It is worth mentioning that, the data receiver 110 can wiredly or wirelessly receive the mouse setting data from an external device (such as a portable carrier, an electronic device, a cloud server or the like), such that the processor 120 can set the function corresponding to each user-operated unit 135. In the following description, a portable carrier, an electronic device and a cloud server are respectively taken as examples to illustrate multiple embodiments of the present disclosure.

Figure 2:
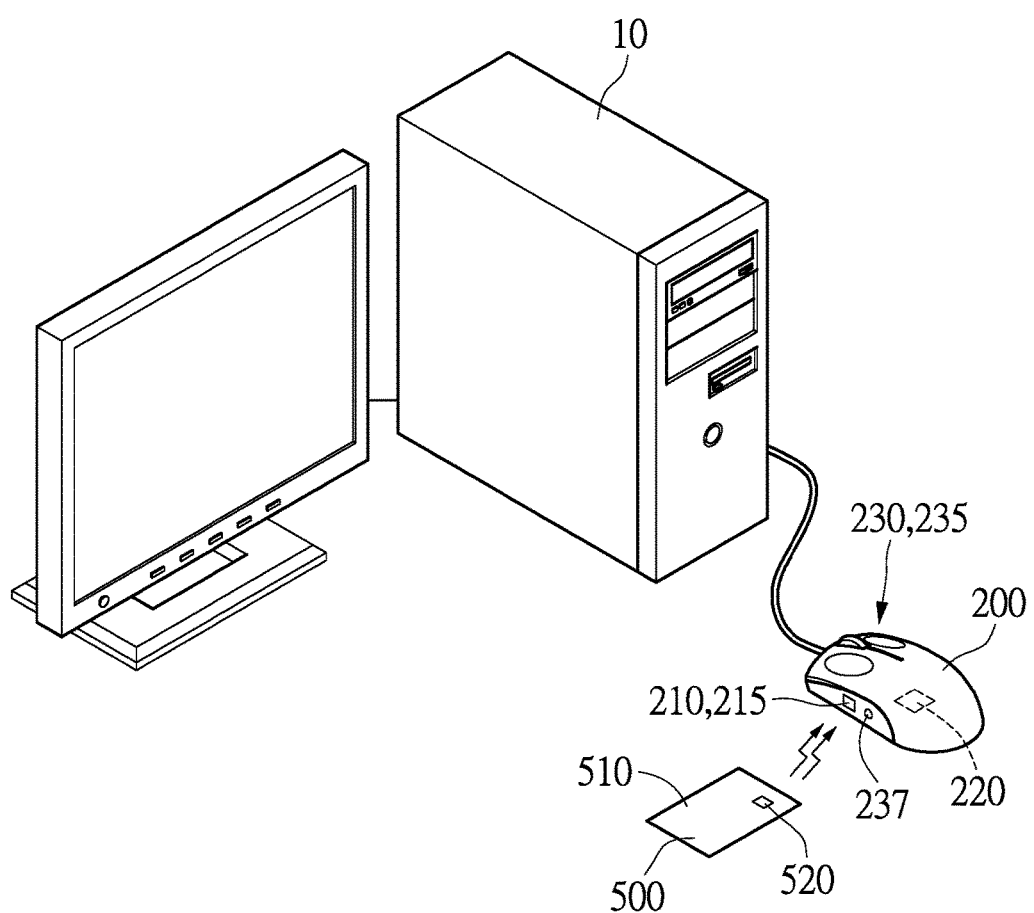
FIG. 2 shows a schematic diagram illustrating a mouse device receiving a mouse setting data from a portable carrier in one embodiment of the present disclosure.

Referring to FIG. 2, a schematic diagram illustrating a mouse device receiving a mouse setting data from a portable carrier in one embodiment of the present disclosure is shown. As shown in FIG. 2, the mouse device 200 receives a mouse setting data from a portable carrier 500, and sets the function corresponding to each of the user-operated units of the mouse device 200 according to the received mouse setting data. A user can operate one of the user-operated units of the mouse device 200 to make electronic device 10 execute the function corresponding to said user-operated unit. In this embodiment, the electronic device 10 is a computer, but is not limited thereto. The portable carrier 500 includes a chip container 510 and a chip 520. The chip 520 is configured in the chip container 510, and the mouse setting data is stored in the chip 510. The portable carrier 500 can be a card-type carrier, such as that for the Taipei Easy Card or other personal cards, and the portable carrier 500 can also be a portable electronic device, such as a smart phone or other portable electronic devices that store the mouse setting data.

The mouse device 200 includes a data receiver 210, a memory unit, an operation interface 230, and a processor 220. The data receiver 210 has a sensing unit 215. The sensing unit 215 is configured to detect and receive the mouse setting data stored in the portable carrier 500. Specifically, when the distance between the portable carrier 500 and the sensing unit 215 is less than a predetermined distance, the sensing unit 215 can detect and receive the mouse setting data stored in the portable carrier 500. After that, the processor 200 can set the function corresponding to each of the user-operated units of the mouse device 200.

In FIG. 2, one of the user-operated units 235 of the operation interface 230 is a setting button 237. When a user presses the setting button 237, the operation interface 230 generates and transmits a setting signal (not shown) to the processor 220. Then, according to this setting signal, the processor 220 controls the data receiver 210 to detect the mouse setting data stored in the portable carrier 500. In addition to pressing the setting button 237, the sensing unit 215 can also be triggered to detect the mouse setting data stored in the portable carrier 500 in other ways. The working principles of the data receiver 210, the memory unit, the operation interface 230 and the processor 220 of the mouse device 200 are similar to the working principles of the data receiver 110, the memory unit 140, the operation interface 130 and the processor 120 of the mouse device 100 provided in the above embodiment, and thus further description thereon is omitted.

Figure 3:
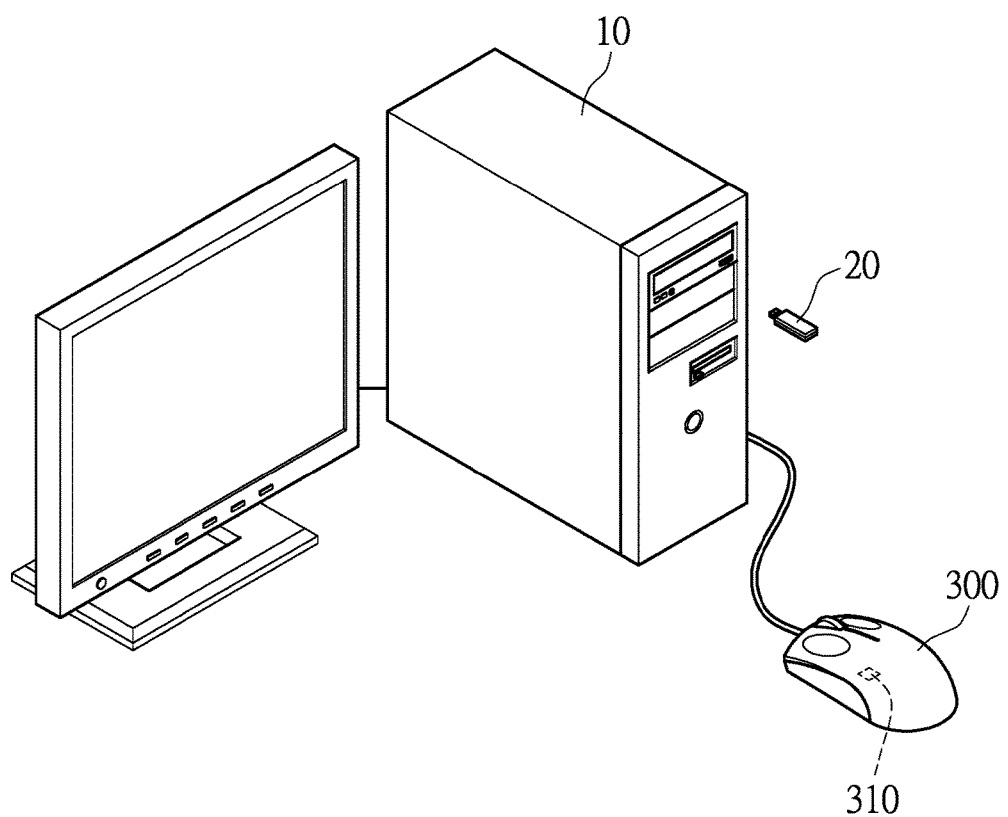
FIG. 3 shows a schematic diagram illustrating a mouse device receiving a mouse setting data from an electronic device in another embodiment of the present disclosure.

Referring to FIG. 3, a schematic diagram illustrating a mouse device receiving a mouse setting data from an electronic device in another embodiment of the present disclosure is shown. Different from the mouse device 200 in the above embodiment, the mouse device 300 wiredly receives the mouse setting data. The data receiver 310 is wiredly connected to an electronic device 10, and the electronic device 10 in this embodiment is a computer, but is not limited thereto. Specifically, a mouse setting data is stored in the electronic device 10, and the data receiver 310 receives the mouse setting data from the electronic device 10. The mouse setting data is transmitted to the electronic device 10 from an external memory device 20, such as a flash drive. The mouse setting data can be transmitted to the electronic device 10 by plugging the external memory device 20 in the electronic device 10.

Figure 4:
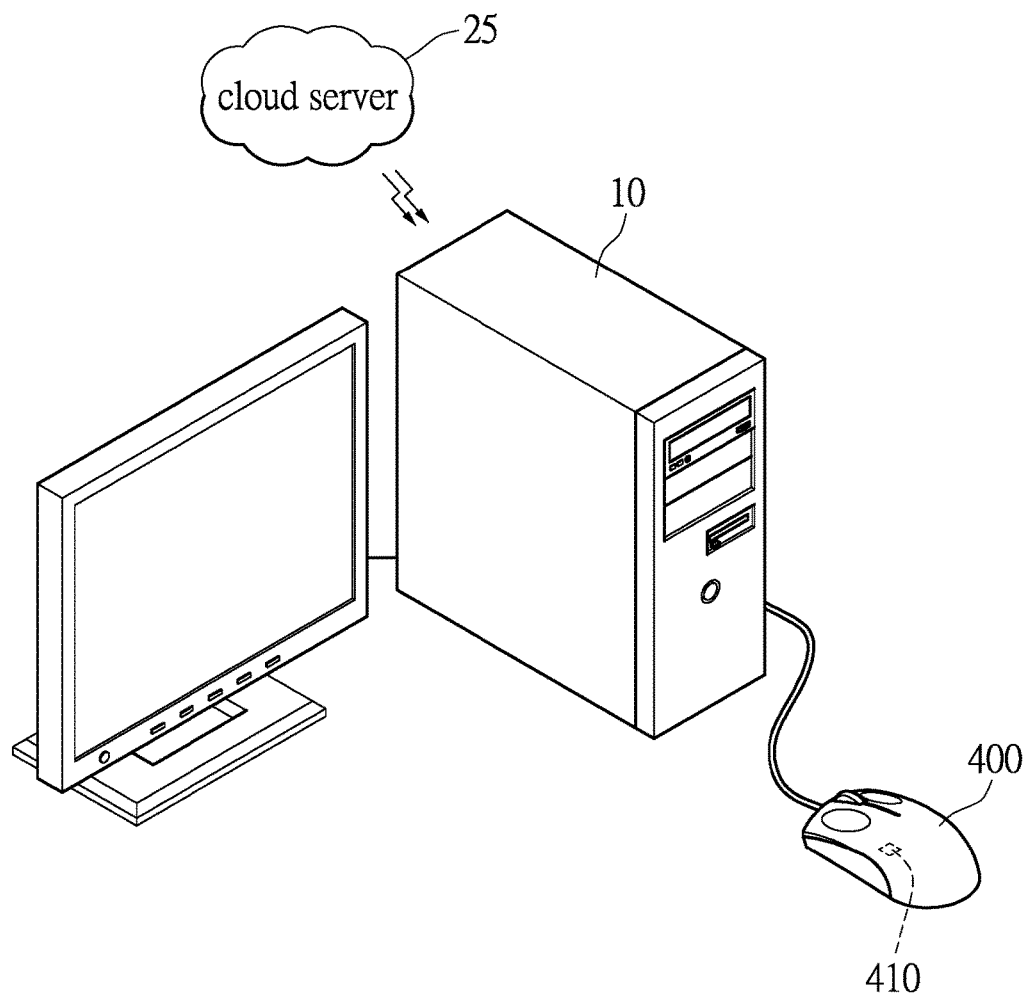
FIG. 4 shows a schematic diagram illustrating a mouse device receiving a mouse setting data from a cloud server in still another embodiment of the present disclosure.

Referring to FIG. 4, a schematic diagram illustrating a mouse device receiving a mouse setting data from a cloud server in still another embodiment of the present disclosure is shown. As shown in FIG. 4, the electronic device 10 can wirelessly obtain a mouse setting data from a cloud server 25, and then transmit the mouse setting data to the data receiver 410 of the mouse device 400. Specifically, the mouse setting data is stored in the cloud server 25. A user can use user-operated units of the mouse device 400 (such as a left button, a right button and a mouse wheel button) and a keyboard (not shown) of the electronic device 10 to control the electronic device 10 to wirelessly obtain the mouse setting data from the cloud server 25. After that, the electronic device 10 transmits the mouse setting data to the data receiver 410 of the mouse device 400.

According to the embodiments illustrated by FIG. 2, FIG. 3 and FIG. 4, the data receiver of the mouse device can wiredly or wirelessly receive a mouse setting data from an external device, such as a portable carrier, an electronic device, a cloud server or the like. Then, a processor of the mouse device sets the function of each of the user-operated units of the mouse device according to the mouse setting data.

To sum up, the portable carrier provided by the present disclosure stores a mouse setting data, and when a user has the portable carrier at hand, the functions of each of the user-operated units of a mouse device provided by the present disclosure can be set according to the mouse setting data received from the portable carrier. In addition, the mouse device provided by the present disclosure uses its data receiver to receive the mouse setting data from an external device, such as a portable carrier, an electronic device, a cloud server or the like. Thus, it is convenient for the user to have the customized mouse setting data anytime and anywhere so as to be able to quickly customize the function of each of the user-operated units of his mouse device on, e.g., a different computer.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A mouse device, comprising: a data receiver, receiving a mouse setting data; a memory unit; an operation interface, including a plurality of user-operated units; an indication unit; and a processor, connected to the data receiver, the memory unit and the operation interface, setting a plurality of functions of the mouse device according to the mouse setting data and storing the mouse setting data in the memory unit, wherein each of the functions of the mouse device corresponds to each of the user-operated units of the operation interface; wherein the data receiver includes a sensing unit, and the sensing unit detects and receives the mouse setting data stored in a portable carrier; wherein the data receiver starts detecting the mouse setting data stored in a portable carrier when a setting signal is received by the processor; and wherein one of the user-operated units of the operation interface is a setting button; when a user presses the setting button, the operation interface generates and transmits the setting signal to the processor, and the processor controls the sensing unit to detect the mouse setting data stored in the portable carrier according to the setting signal; wherein the data receiver further receives an identification data, the identification data is provided for the data receiver to determine whether the mouse setting data corresponds to one specific user, and the processor sets the functions of the mouse device according to the mouse setting data when the mouse device determines that the mouse setting data corresponds to the specific user; and wherein the processor does not set the functions of the mouse device when the mouse device determines that the mouse setting data does not correspond to the specific user; and the indication unit generates an indication signal after the processor sets the functions of the mouse device according to the mouse setting data; wherein the indication signal is a sound and/or a flickering light.

2. The mouse device according to claim 1, wherein the data receiver is connected to an electronic device, the electronic device stores the mouse setting data, and the data receiver receives the mouse setting data from the electronic device.

3. The mouse device according to claim 2, wherein the electronic devices wirelessly receives the mouse setting data stored in a cloud server.

* * * * *